(12) United States Patent
Ganapathy et al.

(10) Patent No.: US 6,842,845 B2
(45) Date of Patent: Jan. 11, 2005

(54) METHODS AND APPARATUSES FOR SIGNAL PROCESSING

(75) Inventors: Kumar Ganapathy, Mountain View, CA (US); Ruban Kanapathipillai, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 623 days.

(21) Appl. No.: 09/792,839

(22) Filed: Feb. 23, 2001

(65) Prior Publication Data

US 2001/0037442 A1 Nov. 1, 2001

Related U.S. Application Data

(63) Continuation-in-part of application No. 09/427,174, filed on Oct. 25, 1999, now Pat. No. 6,330,660.

(51) Int. Cl.[7] ............................................. G06F 15/16
(52) U.S. Cl. ........................................ 712/36; 712/35
(58) Field of Search .................................. 712/35, 36

(56) References Cited

U.S. PATENT DOCUMENTS

| | | |
|---|---|---|
| 4,969,118 A | 11/1990 | Montoye et al. |
| 5,241,492 A | 8/1993 | Girardeau, Jr. |
| 5,341,374 A | 8/1994 | Lewen et al. |
| 5,499,272 A | 3/1996 | Bottomley |
| 5,530,663 A | 6/1996 | Garcia et al. |
| 5,541,917 A | 7/1996 | Farris |
| 5,559,793 A | 9/1996 | Maitra et al. |
| 5,574,927 A | 11/1996 | Scantlin |
| 5,638,524 A | 6/1997 | Kiuchi et al. |
| 5,727,194 A | 3/1998 | Shridhar et al. |
| 5,748,977 A | 5/1998 | Kawasaki et al. |
| 5,761,470 A | 6/1998 | Yoshida |
| 5,822,606 A | 10/1998 | Morton |
| 5,822,613 A | 10/1998 | Takaki et al. |
| 5,825,685 A | 10/1998 | Yamane et al. |
| 5,826,072 A | 10/1998 | Knapp et al. |
| 5,880,984 A | 3/1999 | Burchfiel et al. |
| 5,881,060 A | 3/1999 | Morrow et al. |
| 5,901,301 A | 5/1999 | Matsuo et al. |
| 5,923,871 A | 7/1999 | Gorshtein et al. |
| 5,940,785 A | 8/1999 | Georgiou et al. |
| 5,970,094 A | 10/1999 | Lee |
| 5,983,253 A | 11/1999 | Fischer et al. |
| 5,995,122 A | 11/1999 | Hsieh et al. |
| 6,029,267 A | 2/2000 | Simanapalli et al. |
| 6,058,408 A | 5/2000 | Fischer et al. |

(List continued on next page.)

FOREIGN PATENT DOCUMENTS

EP    0 789 297 A2    8/1997

OTHER PUBLICATIONS

Pirsch, P. et al., "VLSI Architectures for Multimedia", Proceedings of the 1998 IEEE International Conference on Electronics, Circuits and Systems, ISBN 0–7803–5008–1, pp. 3–10, (Sep. 7, 1998).

(List continued on next page.)

*Primary Examiner*—Eric Coleman
(74) *Attorney, Agent, or Firm*—Alan Pedersen-Giles

(57) ABSTRACT

An application specific signal processor (ASSP) performs vectorized and nonvectorized operations. Nonvectorized operations may be performed using a saturated multiplication and accumulation operation. The ASSP includes a serial interface, a buffer memory, a core processor for performing digital signal processing which includes a reduced instruction set computer (RISC) processor and four signal processing units. The four signal processing units execute the digital signal processing algorithms in parallel including the execution of the saturated multiplication and accumulation operation. The ASSP is utilized in telecommunication interface devices such as a gateway. The ASSP is well suited to handling voice and data compression/decompression in telecommunication systems where a packetized network is used to transceive packetized data and voice.

13 Claims, 10 Drawing Sheets

U.S. PATENT DOCUMENTS

| | | | |
|---|---|---|---|
| 6,138,136 A | 10/2000 | Bauer et al. | |
| 6,154,828 A | 11/2000 | Macri et al. | |
| 6,311,263 B1 * | 10/2001 | Barlow et al. | 712/36 |
| 6,330,660 B1 | 12/2001 | Ganapathy et al. | |
| 6,434,690 B1 * | 8/2002 | Ohsuga et al. | 712/35 |
| 6,496,740 B1 * | 12/2002 | Robertson et al. | 700/20 |

OTHER PUBLICATIONS

Pirsch P., et al., "VLSI Architectures for Multimedia," IEEE, Piscataway, NJ, US, Sep. 7, 1998, pp. 3–11.

R65C00/21 Dual CMOS Microcomputer and R65C29 Dual CMOS Microprocessor: Rockwell 1984 Data Book, Rockwell International, Doc. No. 29651N64, pp. 3–1–3–33.

SMJ320C80 Digital Signal Processor, SGUS025—Aug. 1998, pp. 1–154, Texas Instruments, Houston, TX, IEEE Standard 1149.1–1990.

R. Fromm & D. Martin, Instructions Set Architecture, Simulation Infrastructure, and Application Development for Vector IRAM, Oct. 15, 1999, http://ilpsoft.eecs.berkeley.edu:9636/~ilpsoft/99abstracts/rfromm.1.html.

Instructions Set Architecture, web based course, http://www-ee.eng.hawaii.edu/~tep/EE461/Notes/ISA/isa.html, Oct. 15, 1999.

William Stallings, Computer Organization and Architecture, Designing for Performance, Fourth Edition, Prentice Hall, 1996, pp. 313–386.

D. Minoli & E. Minoli, Delivering Voice Over IP Networks, John Wiley & Sons, Inc., 1998.pp. 149–233.

J. McCormick, Supporting Predicated Execution: Techniques and Tradeoffs, Department of Electrical and Computer Engineering, University of Illinois, Urbana, IL May 1996, http://www.crhc.uiuc.edu/IMPACT/abstracts/report//ms–thesis–jim–mccormick.html.

D. Patterson & J. Hennessy, Computer Architecture A Quantitative Approach, Morgan Kaufmann Publishers, Inc., San Mateo, CA 1990, pp., 142–143.

J. Mick & J. Brick, Bit–Slice Microprocessor Design, McGraw–Hill Book Company, 1990, p. 191.

R. Kain, Advanced Computer Architecture, A Systems Design Approach, Department of Electrical Engineering, University of Minnesota, Prentice Hall, NJ, pp. 16–17.

J. Cavanagh, Digital Computer Arithmetic, Design and Implementation, McGraw–Hill Book Company, 1984, pp., 1–12.

* cited by examiner

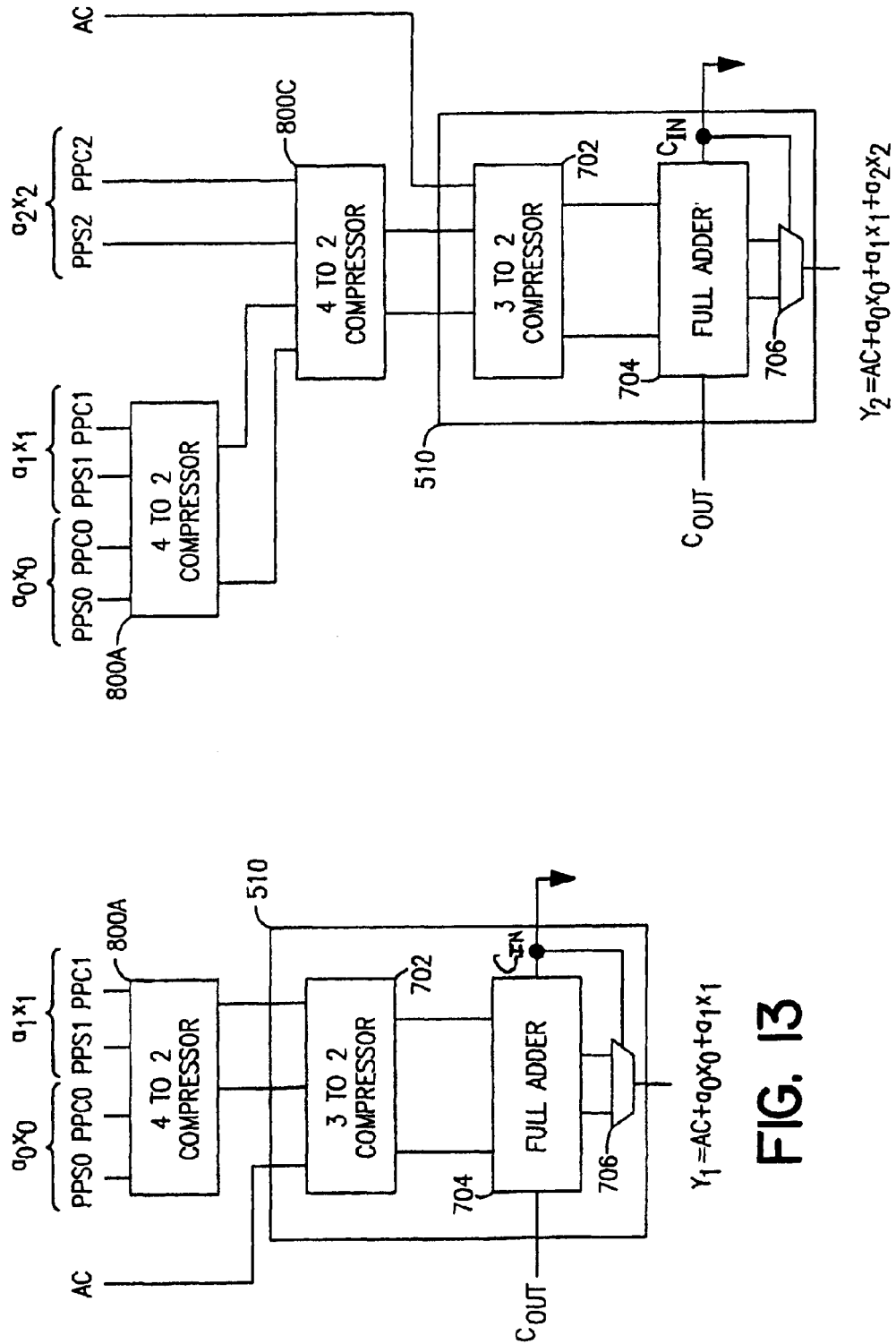

METHODS AND APPARATUSES FOR SIGNAL PROCESSING

CROSS REFERENCE TO RELATED APPLICATION

This non-provisional patent application, filed by Ganapathy et al, claims the benefit and is a continuation-in-part of U.S. non-provisional patent application No. 09/427,174 filed on Oct. 25, 1999 by Ganapathy et al, now U.S. Pat. No. 6,330,660.

FIELD OF THE INVENTION

This invention relates generally to digital signal processing devices. More particularly, the invention relates to multiply and accumulators (MACs).

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. DSPs are often programmed in a loop to continuously perform a MAC instruction using different operands.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation Yn may be evaluated by using a software program. However in some applications, it is necessary that the equation be evaluated as fast as possible. One way to do this is to perform the computations using hardware components such as a DSP device programmed to compute the equation Yn. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

However, not all computations of equations can be vectorized. This is the case with some of the standardized compression/decompression algorithms used in telecommunication systems. In this case, the computation processes typically can not be performed in parallel by standard DSPs. A non-vectorizable equation usually must be processed in a specific manner due to some constraints. Exemplary of this is the voice compression and voice decompression ITU standards used in coder/decoders (CODECs). Specifically, this includes the ITU standards G.723.1, G.728, and G.729. In equations for these functional operations, sixteen bit fixed point arithmetic is utilized. In order to be compliant with the standards, operations found within the specification must be carried out exactly in order to maintain signal quality. Additionally, the bits must be exact and the saturation must be carried out appropriately. Four terms of a typical non-vectorizable equation where nonvectorized processing is required, are $YOUTn = ((((AC +_L a_0 X_0) +_L a_1 X_1) +_L a_2 X_2) +_L a_3 X_3)$ where "$+_L$" refers to a limiting of the addition to a range of values between a positive saturation value and a negative saturation value and AC is an accumulated value for a prior processing cycle. A typical DSP device needs to process each term separately from inner brackets to outer brackets. One disadvantage to processing in this fashion is that the extra processing steps require additional cycles. The additional cycles decrease the channel handling capability of a DSP device thereby requiring that additional DSP devices be used to increase the channel handling capability. Additionally, in a multiple DSP system, a number of DSPs may be sitting idle awaiting completion of the term presently being computed by the active DSP. This is an inefficient use of computing resources.

Additionally, the quality of service over a telephone system often relates to the processing speed of signals. That is particularly the case when a DSP is to provide voice processing, such as voice compression, voice decompression, and echo cancellation for multiple channels. More recently, processing speed has become even more important because of the desire to transmit voice aggregated with data in a packetized form for communication over packetized networks. Delays in processing the packetized voice signal tend to result in the degradation of signal quality on receiving ends.

It is desirable to provide improved processing of voice and data signals to enhance the quality of voice and data communication over packetized networks. It is desirable to improve the efficiency of using computing resources when performing signal processing functions.

BRIEF DESCRIPTIONS OF THE DRAWINGS

FIGS. 8 through 16 are block diagrams illustrating the configuration and operation of the ASSP of the present invention when performing a SATMAC operation.

Like reference numbers and designations in the drawings indicate like elements providing similar functionality. A letter after a reference designator number represents an instance of an element having the reference designator number.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention includes a method, apparatus and system for voice and data communication processing. Briefly, multiple application specific signal processors (ASSPs) are provided within gateways in communication systems to provide improved voice and data communication over a packetized network. A gateway is a device for connecting multiple networks and devices that use different protocols. Each ASSP includes four core processors in order to simultaneously process four channels of voice or data. Each core processor preferably includes four signal processing units (SPs) to simultaneously process four samples or terms of digital voice signals originally packetized for communication over IP, ATM, Frame Relay, SONET or other packetized network. Each of the SPs can perform vectorized operations normally associated with prior art DSP devices as well as non-vectorized operations including saturated multiplication and accumulation for voice compression standards. Each SP includes multiple adders for simultaneous processing of multiple voice and data communication signal samples. Each ASSP is flexible and can be programmed to perform many network functions or data/voice processing functions, including voice compression for CODECs, simply by altering the software program controlling the commands executed by the ASSP.

Figure 1A:
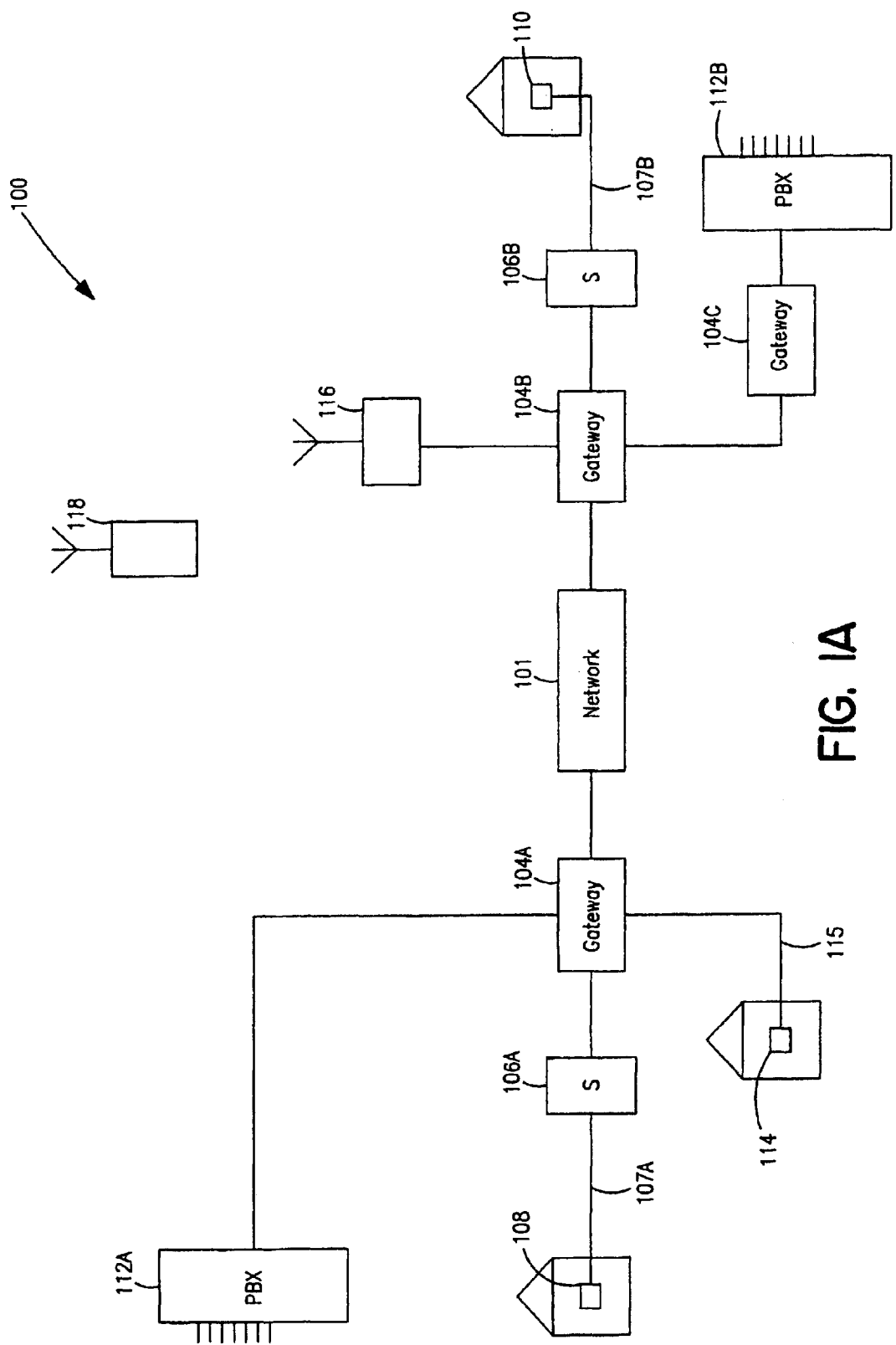
FIG. 1A is a block diagram of a system utilizing the present invention.

Referring now to FIG. 1A, a voice and data communication system 100 is illustrated. The system 100 includes a network 101 which is a packetized or packet-switched network, such as IP, ATM, frame relay, or SONET/SDL. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A, 104B, and 104C in order to packetize the information received for transmission across the network 101. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switch telephone network (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A, 104B and 104C, incoming signals are packetized for transmission across the network 101. Signals received by the gateways 104A, 104B and 104C from the network 101 are depacketized for distribution to the appropriate destination.

Figure 1B:
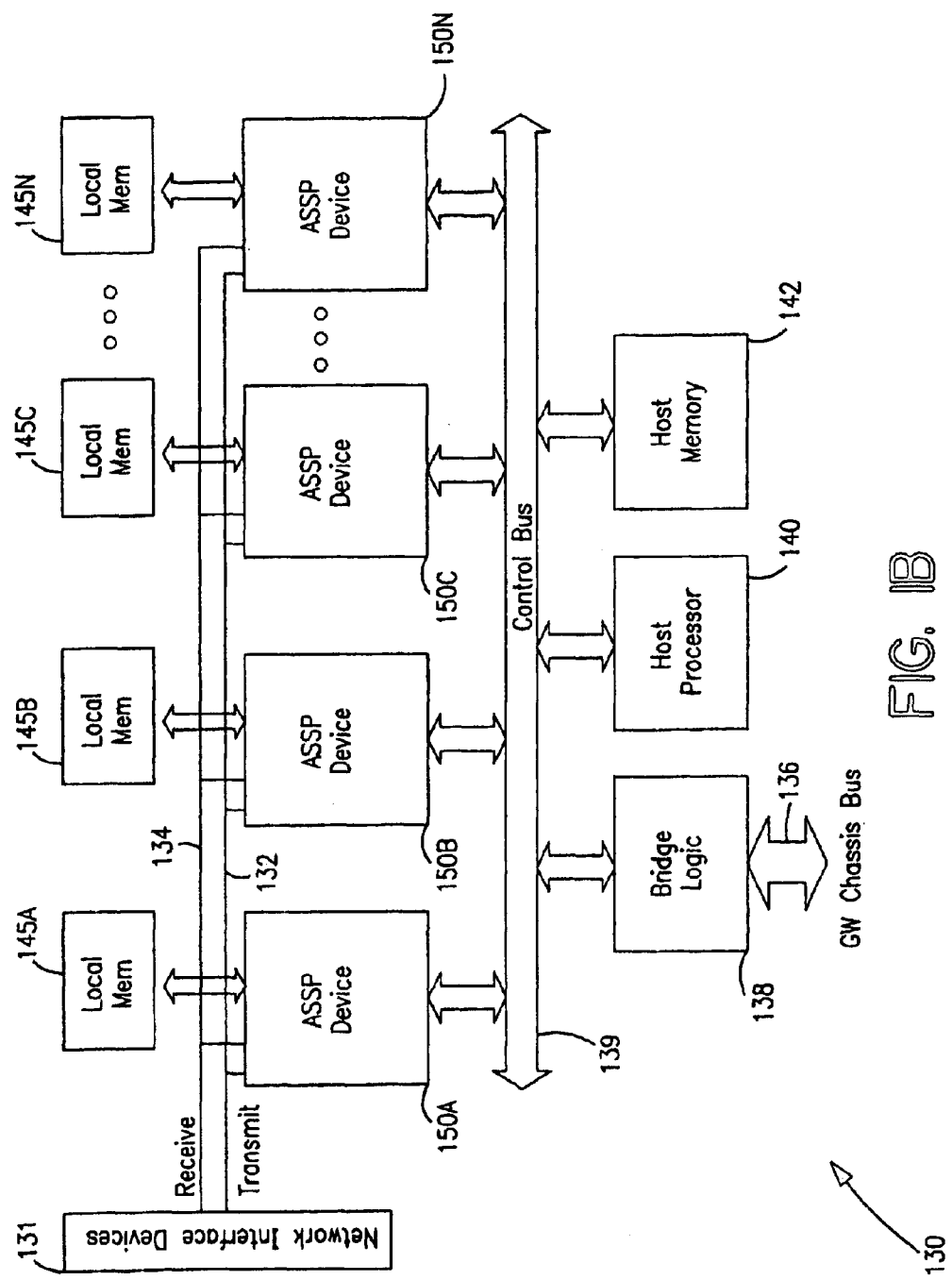
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Network interface devices 131 of NIC 130 provide interfaces to various devices connected to the gateway, including the network 101. In interfacing to the network 101, the network interface devices packetize data for transmission out on the network 101 and depacketize data which is to be received by the ASSP devices. Network interface devices 131 process information received by the gateway on the receive bus 134 and provides it to the ASSP devices. Information from the ASSP devices 150 is communicated on the transmit bus 132 for transmission out of the gateway. A traditional network interface device is a multi-channel serial interface or a UTOPIA device. The NIC 130 couples to a gateway chassis bus 136 within the gateway 104. Bridge logic 138 transceives information between bus 136 and NIC 130. Bridge logic 138 transceives signals between the NIC 130 and the chassis bus 136 onto the control bus 139 for communication to either one or more of the ASSP devices 150A–150N, a host processor 140, or a host memory 142. Coupled to each of the one or more ASSP devices 150A through 150N (generally referred to as ASSP 150) are local memory 145A through 145N (generally referred to as local memory 145), respectively. Digital data on the receive bus 134 and transmit bus 132 is preferably communicated in 8-byte wide fashion. Local memory 145 is used as a scratchpad memory by each of the ASSPs 150.

Each of the ASSPs 150 provide signal processing capability for the gateway. The type of signal processing provided is flexible because each ASSP may executed differing signal processing programs. Typical signal processing applications for an ASSP include (a) echo cancellation; (b) video, audio, and voice/speech compression/decompression (voice/speech coding and decoding); (d) delay handling (packets, frames, SONETs/SDLs); (e) loss handling; (f) connectivity (LAN and WAN); (g) security (encryption/decryption); (h) telephone connectivity; (i) protocol processing (reservation and transport protocols, RSVP, TCP/IP, RTP, UDP); (j) filtering; (k) suppression; (l) length handling (frames, packets, SONETs); and other digital signal processing functions associated with the communication of voice and data over a communication system. Each ASSP 150 can perform other functions in order to transmit voice and data to the various endpoints of the system 100 within a packet data stream over a packetized network.

Figure 2:
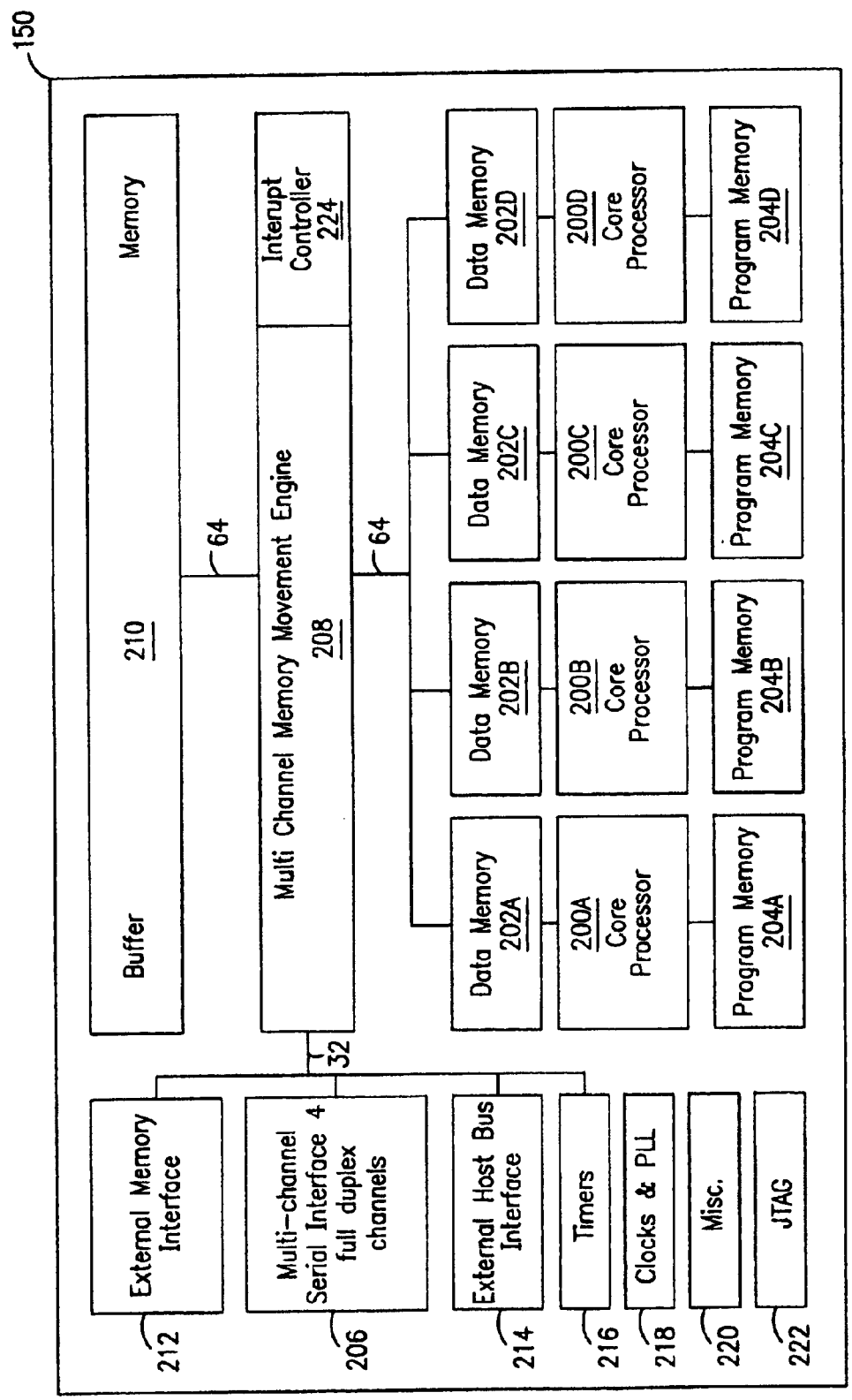
FIG. 2 is a block diagram of the Application Specific Signal Processor (ASSP) of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to external memory. The ASSP 150 includes an external host interface 214 for interfacing to the external host processor 140 of FIG. 1B. The external host interface 214 may be replaced with an internal host processor 140 within the ASSP 150. Further included within the ASSP 150 are timers 216, clock generators and a phase-lock loop 218, miscellaneous control logic 220, and a Joint Test Action Group (JTAG) test access port 222 for boundary scan testing. Multi-channel serial interface unit may be replaced with a UTOPIA parallel interface for some applications such as ATM. The ASSP 150 further includes an interrupt controller 224 to assist in the control of the ASSP 150.

Figure 3:
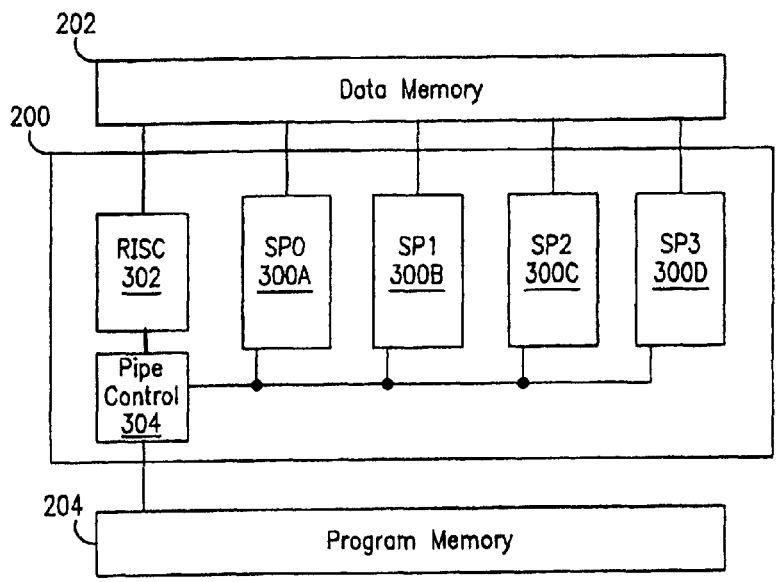
FIG. 3 is a block diagram of an instance of the core processors within the ASSP of the present invention.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D. The core processor 200 includes four signal processing units SP0 300A, SP1 300B, SP2 300C and SP3 300D. The core processor 200 further includes a reduced instruction set computer (RISC) unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D.

Figure 4:
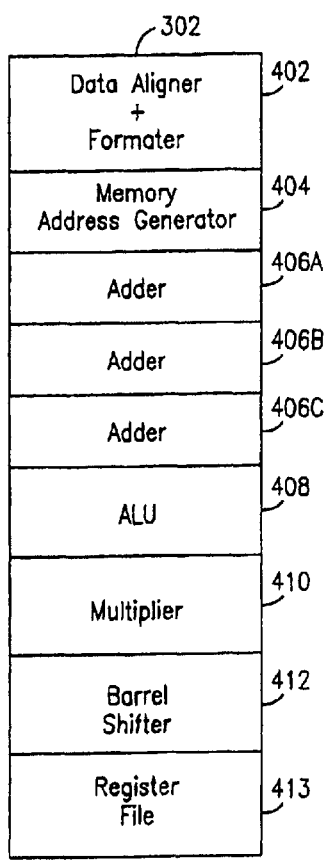
FIG. 4 is a block diagram of the RISC processing unit within the core processors of FIG. 3.

Referring now to FIG. 4, a block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202.

Figure 5:
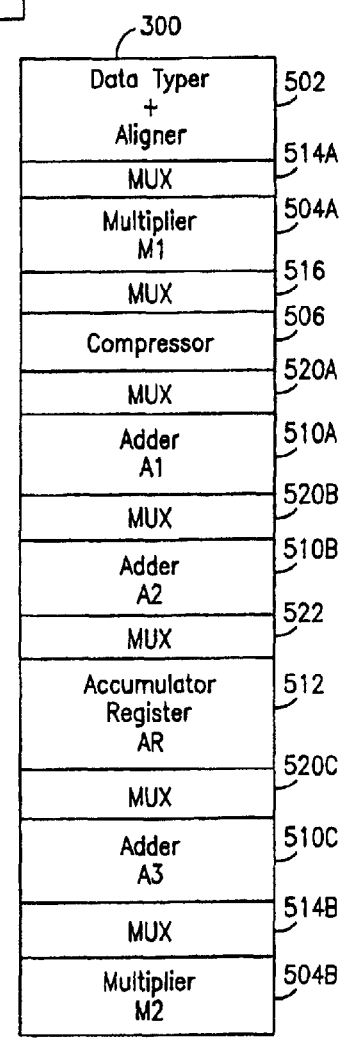
FIG. 5 is a block diagram of an instance of the signal processing units within the core processors of FIG. 3.

Referring now to FIG. 5, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B. The multiplexers used to configure the processing units 300A–300B are not shown in the following figures so as not to unnecessarily obscure aspects of the present invention.

Figure 6:
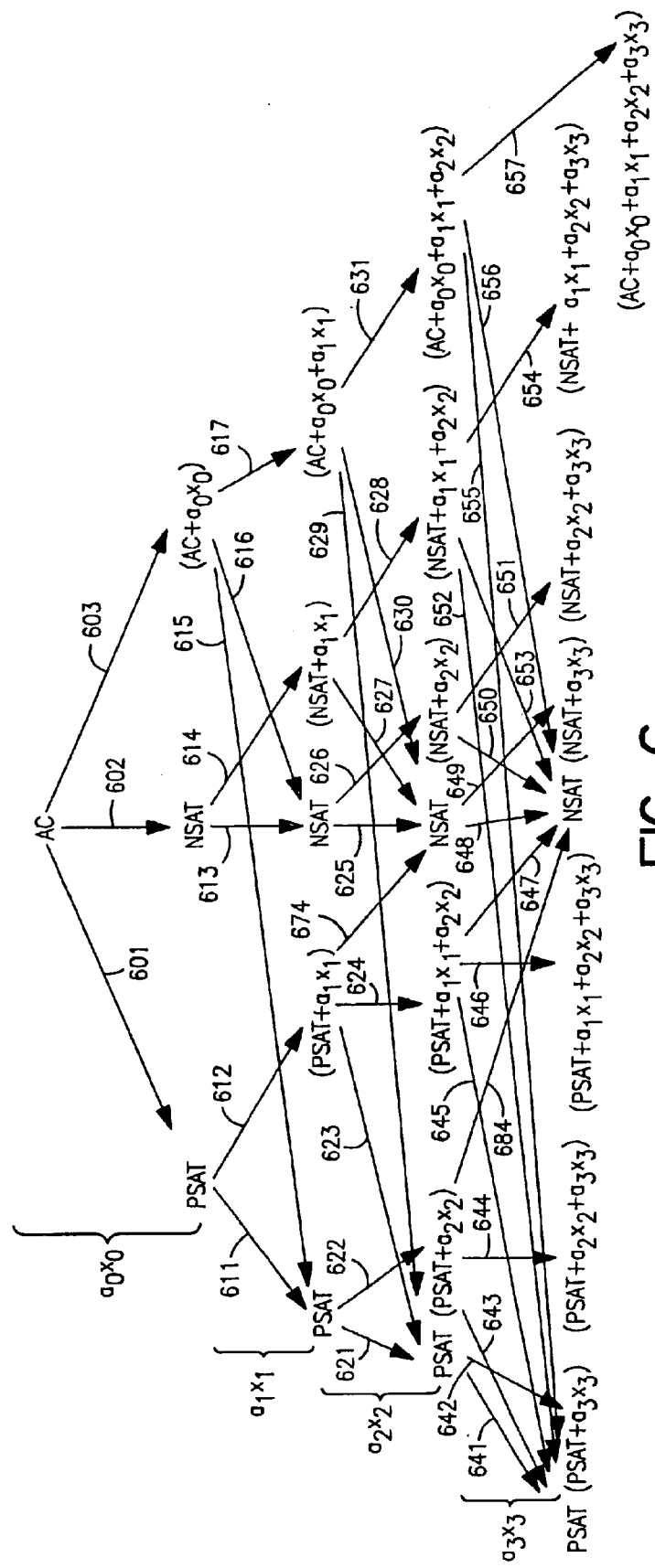
FIG. 6 is a chart illustrating the decision tree of the possible partial products for the saturated multiplication and accumulation (SATMAC) operation of the ASSP of FIG. 2.

Referring now to FIG. 6, a decision tree is illustrated for the saturation, multiplication and accumulation (SATMAC) operation of the ASSP 150. The decision tree in FIG. 6 illustrates additions and multiplication of terms for a non-vectorized computation of four terms of addition and four terms of multiplication. The nonvectorized equation is $YOUTn = ((((AC +_L a_0 X_0) +_L a_1 X_1) +_L a_2 X_2) +_L a_3 X_3)$ where "$+_L$" refers to a limiting of the addition to a range of values between a positive saturation value and a negative saturation value. The decision tree of FIG. 6 minimizes the number of hardware adders for carrying out the evaluation of the SATMAC equations. The decision tree in FIG. 6 provides for the computation of the four terms in the YOUTn equation within one clock cycle. This is equivalent to performing four multiplications and four additions in one step. In this manner, the processing speed of the signal processor is improved. If an additional set of four terms is desired to be computed for the equation YOUTn, additional clock cycles are utilized with the prior value becoming AC. If additional terms are desired to be computed in one clock cycle, a similar decision tree to that of FIG. 6 may be provided in order to minimize the number of adders and multiplication steps for its computation.

In accordance with ITU standards for compression/decompression, the highest possible value obtained by these equations is the positive saturation value (PSAT) of 7FFF hex. In accordance with ITU standards, the smallest possible value as a result of each step of these equations is the negative saturation value (NSAT) of 8000 hex. The limiting addition in of each addition step assures this is the case which results in this being a nonvectorized equation. Referring to FIG. 6, in the first level of the decision tree when adding $a_0 X_0$ to AC there are three possible resultant values because of the limiting addition. The three possible resultant values, PSAT, NSAT, and $(AC + a_0 X_0)$, are illustrated by the decision paths 601–603. In case that the value of $(AC + a_0 X_0)$ is greater than or equal to PSAT $(7FFF_h)$ as indicated by path 601, the result is limited to the PSAT value of $7FFF_h$. In the case that $(AC + a_0 X_0)$ is less than or equal to NSAT $(8000_h)$ as indicated by path 602, the result is limited to the NSAT value of $8000_h$. In the case that the value of $(AC + a_0 X_0)$ does not meet or exceed either PSAT or NSAT, the resultant value of $(AC + a_0 X_0)$ may be computed as indicated by path 603.

In the next level of the decision tree, a determination is made on the outcomes of how $a_1 X_1$ is added to the three prior resultant values of $(AC + a_0 X_0)$. In the case that the prior resultant value is PSAT, if $a_1 X_1$ is a positive value, this would try to generate a value greater than PSAT, in which case the result is limited to PSAT along path 611 as provided for by the ITU specifications. If $a_1 X_1$ is a negative value which is added to PSAT, then the resultant output reduces PSAT by the value of $a_1 X_1$ as indicated by the path 612. Thus, when adding a negative value to PSAT, the negative value being one term which itself has been limited to the range of saturation values, such as when $a_1 X_1$ is a negative value, the result will not exceed the NSAT value of 8000 hex. Next, looking at the prior result being NSAT in the computation of $(AC + a_0 X_0)$, if $a_1 X_1$ is a negative value and added to NSAT, the resultant is limited to the NSAT value 8000 hex as indicated by the path 613. However, if $a_1 X_1$ is a positive value, when added to NSAT the resultant becomes $(NSAT+a_1X_1)$ as indicated by path 614. Thus, the resultant addition of $a_1X_1$ to NSAT does not exceed the positive saturation value PSAT. Next, when adding $a_1X_1$ to the resultant value $(AC+a_0X_0)$, three results are possible. In one case, the result may be greater than or equal to PSAT and limited thereto as indicated by the path 615. Alternatively, the resultant may be less than or equal to NSAT and limited thereto as indicated by path 616. If the prior result is $(AC+a_0X_0)$ which neither meets or exceeds the PSAT or NSAT values, $a_1X_1$ is added to $(AC+a_0X_0)$ resulting in the equation $(AC+a_0X_0+a_1X_1)$ as indicated by the path 617.

In the next level of the decision tree, the term $a_2X_2$ is evaluated when added to the prior possible outcomes from the addition of the term $a_1X_1$. In adding $a_2X_2$ to PSAT, there are two possible outcomes as indicated by path 621 and path 622. In the case of that $a_2X_2$ is a positive number being added to PSAT, the result is greater than PSAT and limited thereto as indicated by path 621. In the case that $a_2X_2$ is a negative number, when added to PSAT the resultant becomes $(PSAT+a_2X_2)$ as indicated by the path 622. When adding $a_2X_2$ to the prior result of $(PSAT+a_1X_1)$, there are three possible resultants. In the case that $a_2X_2$ is a positive value having a magnitude greater than the magnitude of a negative value of $a_1X_1$, then when $a_2X_2$ is added to $(PSAT+a_1X_1)$, then the result reaches or exceeds PSAT and is limited thereto as indicated by the path 623. In the case that $a_2X_2$ is a negative value having a magnitude less than the magnitude of a positive value of $a_1X_1$ or $a_2X_2$ is a positive value having a magnitude less than the magnitude of a negative value of $a_1X_1$, then the result becomes $(PSAT+a_1X_1)+a_2X_2)$ as indicated by the path 624. Because twos compliment binary numbers are used, the number of positive and negative numbers between NSAT and PSAT is non symmetric. As a result when $a_2X_2$ is a negative value having a large magnitude and $a_1X_1$ is a negative value of having a large magnitude, the result of adding $a_2X_2$ to $(PSAT+a_1X_1)$ is less than or equal to NSAT and is limited thereto, as indicated by the path 674. When adding $a_2X_2$ to the prior result of NSAT, there are two possible results along path 625 and 626. If $a_2X_2$ is a negative number, when added to NSAT it becomes more negative than NSAT and thus requires limiting to NSAT as indicated by the path 625. In the case that $a_2X_2$ is a positive number, when added to NSAT the resultant value becomes $(NSAT+a_2X_2)$ as indicated by the path 626. Because the value of NSAT is of such negative magnitude, there is no value of $a_2X_2$ that when added thereto would result in an outcome of PSAT, when added to NSAT. When adding $a_2X_2$ to the prior result $(NSAT+a_1X_1)$ there are two possible results. If $a_2X_2$ is a negative value having a magnitude larger than the magnitude of a positive value for $a_1X_1$, then when added to $(NSAT+a_1X_1)$ the result is NSAT as indicated by the path 627. In the case that $a_2X_2$ is a positive value or a negative value having a magnitude less than the magnitude of a positive value of $a_1X_1$, then when added to $(NSAT+a_1X_1)$ the resultant is $(NSAT+a_1X_1+a_2X_2)$ as indicated by the path 628. Because of the limiting of terms and equation values, the value of $(NSAT+a_1X_1)$ is a value nearer to zero such that there is no value of $a_2X_2$ that when added to $(NSAT+a_1X_1)$ would cause the result to reach or exceed PSAT. Only when there are three terms in the prior result is it possible for the result to reach or exceed either PSAT or NSAT. When adding $a_2X_2$ to the prior result $(AC+a_0X_0+a_1X_1)$, there are three possible results indicated by the paths 629–631. In the case that $a_2X_2$ has a large positive value, when added to this prior result the resultant may be PSAT as illustrated by path 629. In the case that $a_2X_2$ is a very large negative number, when added to this prior result, the resultant may be NSAT as indicated by the path 630. Alternatively, the resultant of the addition may be within the range of PSAT and NSAT such that when adding $a_2X_2$ to the prior value result of $(AC+a_0X_0+a_1X_1)$, the resultant is $(AC+a_0X_0+a_1X_1+a_2X_2)$ as indicated by the path 631.

In the next level of the decision tree, the addition of the term $a_3X_3$ is evaluated when added to the prior possible results. There is a possibility of nine possible results after the term $a_3X_3$ is added. These nine possible results are PSAT, $(PSAT+a_3X_3)$, $(PSAT+a_2X_2+a_3X_3)$, $(PSAT+a_1X_1+a_2X_2+a_3X_3)$, NSAT, $(NSAT+a_3X_3)$, $(NSAT+a_2X_2+a_3X_3)$, $(NSAT+a_1X_1+a_2X_2+a_3X_3)$ and $(AC+a_0X_0+a_1X_1+a_2X_2+a_3X_3)$. When adding $a_3X_3$ to the prior resultant value PSAT, there are two possible results indicated by paths 641 and 642. If $a_3X_3$ is a positive value then the resultant is greater than PSAT and limited thereto as indicated by the path 641. There is no negative value for $a_3X_3$ that would result in NSAT when it is added to the prior result PSAT. In the case that $a_3X_3$ is a negative value, the resultant output is $(PSAT+a_3X_3)$ as indicated by the path 642. When adding $a_3X_3$ to the prior result of $(PSAT+a_2X_2)$, there are three possible results. In the case that $a_3X_3$ is a large positive value, when added to $(PSAT+a_2X_2)$ the resultant is greater than or equal to PSAT and limited thereto as indicated by the path 643. When $a_3X_3$ is a negative value having a large magnitude and $a_2X_2$ is a negative value of having a large magnitude, then the result of adding $a_3X_3$ to $(PSAT+a_2X_2)$ is less than or equal to NSAT and is limited thereto, as indicated by the path 684. Otherwise, when $a_3X_3$ is added to $(PSAT+a_2X_2)$, the resultant is $(PSAT+a_2X_2+a_3X_3)$ as indicated by the path 644. When adding $a_3X_3$ to the prior result of $(PSAT+a_1X_1+a_2X_2)$, there are three possible results indicated by paths 645–647. In the case that $a_3X_3$ is a large positive value, when added to $(PSAT+a_1X_1+a_2X_2)$ it results in a value of greater than or equal to PSAT which is limited thereto as indicated by the path 645. In the case that $a_3X_3$ is a large negative value, when added to $(PSAT+a_1X_1+a_2X_2)$ it results in a value of less than or equal to NSAT which is limited to NSAT as indicated by the path 647. Otherwise, for a result that is within the range of PSAT and NSAT, when $a_3X_3$ is added to $(PSAT+a_1X_1+a_2X_2)$, the result is $(PSAT+a_1X_1+a_2X_2+a_3X_3)$ as indicated by the path 646. When adding $a_3X_3$ to the prior result of NSAT, there are two possible resultants as indicated by paths 648–649. In the case that $a_3X_3$ is a negative value, the result of it being added to results in a value less than or equal to NSAT which is limited to NSAT as indicated by the path 648. In the case that $a_3X_3$ is a positive value, the result of it being added to NSAT is $(NSAT+a_3X_3)$ as indicated by the path 649. When adding $a_3X_3$ to the prior result of $(NSAT+a_2X_2)$, there are two possible results indicated by the paths 650–651. In the case that $a_3X_3$ is a large negative value, the result of it being added to $(NSAT+a_2X_2)$ is a value less than or equal to NSAT which is limited thereto as indicated by the path 650. There is no value of $a_3X_3$ that when added to $(NSAT+a_2X_2)$ would result in PSAT. If the result is within the range of PSAT and NSAT, alternative result when $a_3X_3$ is added to $(NSAT+a_2X_2)$ is $(NSAT+a_2X_2+a_3X_3)$ as indicated by the path 651. When $a_3X_3$ is added to the prior result of $(NSAT+a_1X_1+a_2X_2)$, there are three possible resultants indicated by the paths 652–655. In the case that $a_3X_3$ is a very large negative number, when $a_3X_3$ is added to $(NSAT+a_1X_1+a_2X_2)$ the result is less than or equal to NSAT and limited thereto as indicated by the path 653. In the case that $a_3X_3$ is a very large positive number, when $a_3X_3$ is added to $(NSAT+a_1X_1+a_2X_2)$ a result may be a value greater than or equal to PSAT which would be limited to PSAT as indicated by the path 652. Otherwise, if the resultant value is between the range of PSAT and NSAT, when $a_3X_3$ is added to (NSAT+$a_1X_1$+$a_2X_2$) the result is (NSAT+$a_1X_1$+$a_2X_2$+$a_3X_3$) as indicated by the path 654. When $a_3X_3$ is added to the prior result (AC+$a_0X_0$+$a_1X_1$+$a_2X_2$), there are three possible resultant values indicated by paths 655–657. In the case that $a_3X_3$ is a very large positive value, when added to the prior result (AC+$a_0X_0$+$a_1X_1$+$a_2X_2$), the result may be a value greater than or equal to PSAT which is limited thereto as indicated by the path 655. In the case that $a_3X_3$ is a very large negative number, when added to the prior result (AC+$a_0X_0$+$a_1X_1$+$a_2X_2$), the result may be a value less than or equal to NSAT which is limited thereto as indicated by the path 656. If the resultant value is between the range of PSAT and NSAT, the resultant of adding $a_3X_3$ to the prior result (AC+$a_0X_0$+$a_1X_1$+$a_2X_2$) is (AC+$a_0X_0$+$a_1X_1$+$a_2X_2$+$a_3X_3$) as indicated by the path 657. After the addition of $a_3X_3$ is evaluated, one of the nine final results after the addition of $a_3X_3$ is selected as the value of YOUTn. The selected term is a function of the saved carryout bits from the equations that are evaluated.

Not all additions in the decision tree need be performed or saved. In many instances only the sign bit of the result (the MSB of the sum output) needs to be saved to determine the next path along the decision tree which needs to be evaluated. Additionally, because NSAT and PSAT differ by only the value of 1, only one set of the final resultant equations having either PSAT or NSAT needs to be evaluated and its result saved for selection as YOUTn. In the case that the PSAT equations are utilized, the value of 1 need only to be added in order to obtain the NSAT equations. In the case that the NSAT equations are evaluated, the value of 1 need only be subtracted therefrom in order to obtain the PSAT equations. In the description of FIGS. 8 through 11 that follow, the PSAT equations are evaluated. In order to convert them into the NSAT equations, the value of 1 is provided as an input into the carry input path of the adders 510 in order to provide the NSAT equations. Therefore, when evaluating four terms of a nonvectorized equation in one clock cycle, only seven of the adders 510 are required. The seven adders add (PSAT+$a_3X_3$), (PSAT+$a_2X_2$+$a_3X_3$), (PSAT+$a_1X_1$+$a_2X_2$+$a_3X_3$), (AC+$a_0X_0$+$a_1X_1$), (AC+$a_0X_0$+$a_1X_1$+$a_2X_2$) and (AC+$a_0X_0$+$a_1X_1$+$a_2X_2$+$a_3X_3$). As previously discussed, the three PSAT equations are easily converted into NSAT equations by simply adding one into the carry in path of the full adders 510. In order to represent that either PSAT or NSAT can be evaluated, the equations with PSAT are referred to as (NSAT/PSAT+$a_3X_3$), (NSAT/PSAT+$a_2X_2$+$a_3X_3$), and (NSAT/PSAT+$a_1X_1$+$a_2X_2$+$a_3X_3$) it being understood that when NSAT is to be evaluated a logical one is asserted as the Carry In bit.

Figure 7:
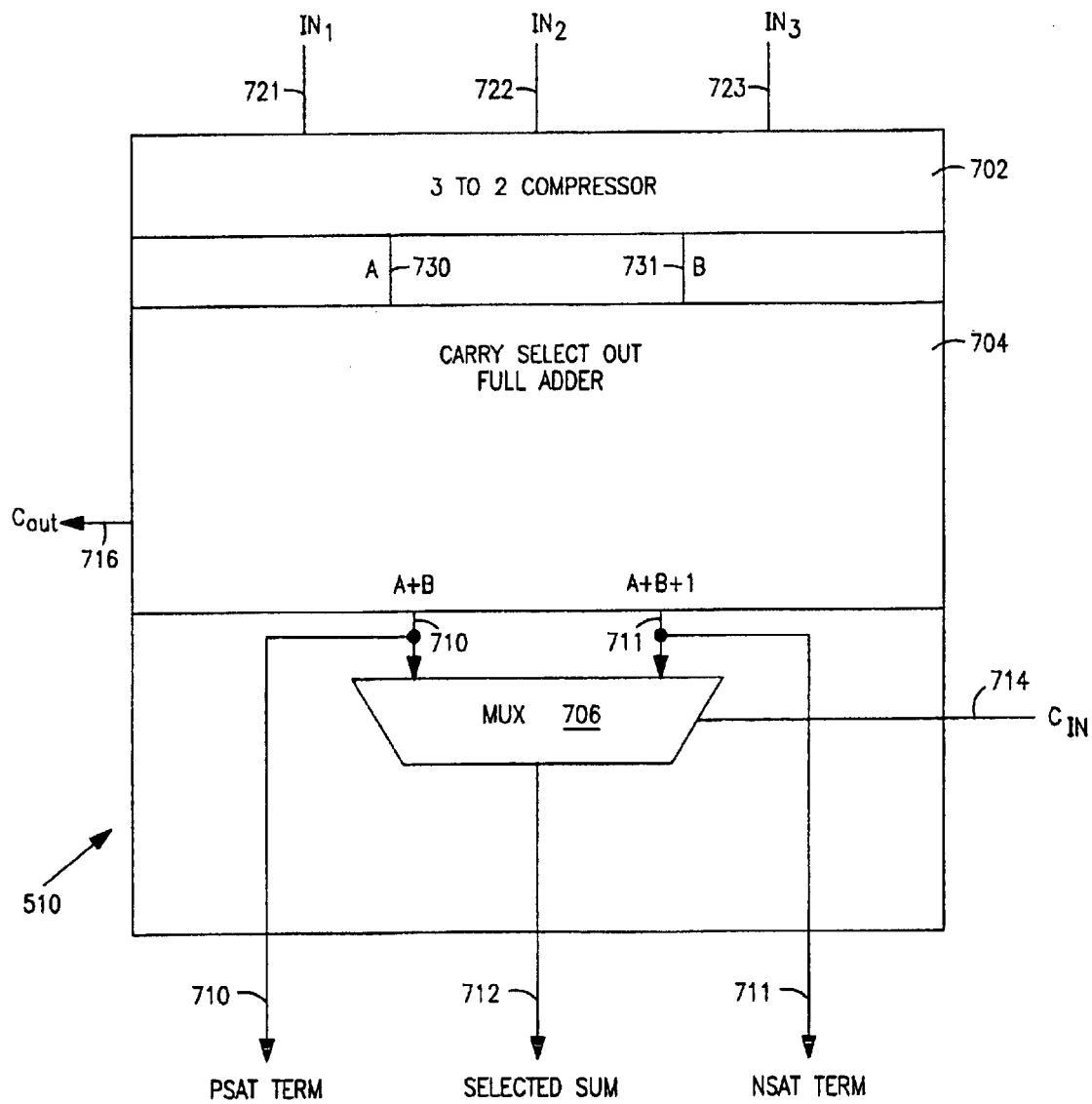
FIG. 7 is a block diagram of an instance of the adders within the signal processing unit of FIG. 5.

Referring now to FIG. 7, adder 510 is illustrated which is representative of each of the adders 510A–510C in the signal processing unit 300. Adder 510 includes a 3-to-2 compressor 702, a carry select out full adder 704, and a multiplexer 706. Multiplexer 706 selects between the A+B output from the full adder 704 on bus 710 and A+B+1 output from the full adder 704 on bus 711 as its output, the selected sum 712, based on the carry input Cin 714. If Cin is a value of one, the A+B+1 output 711 is selected as the selected sum 712. If Cin is a value of zero, the A+B output 710 is selected as the selected sum 712. The 3-to-2 compressor 702 compresses the three inputs $IN_1$ 721, $IN_2$ 722, and $IN_3$ 723 into two outputs A 730 and B 731. Outputs A 730 and B 731 are provided as inputs into the carry select out full adder 704. Carry select out full adder 704 receives A 730 and B 731 from the 3-to-2 compressor 702 to generate (A+B) 701, (A+B+1) 711 and the carryout Cout 716 in accordance with the values of A and B. The (A+B) 710 is an evaluation of the equation containing the PSAT term while the (A+B+1) value is an evaluation of the equation containing the NSAT term.

Figure 8:
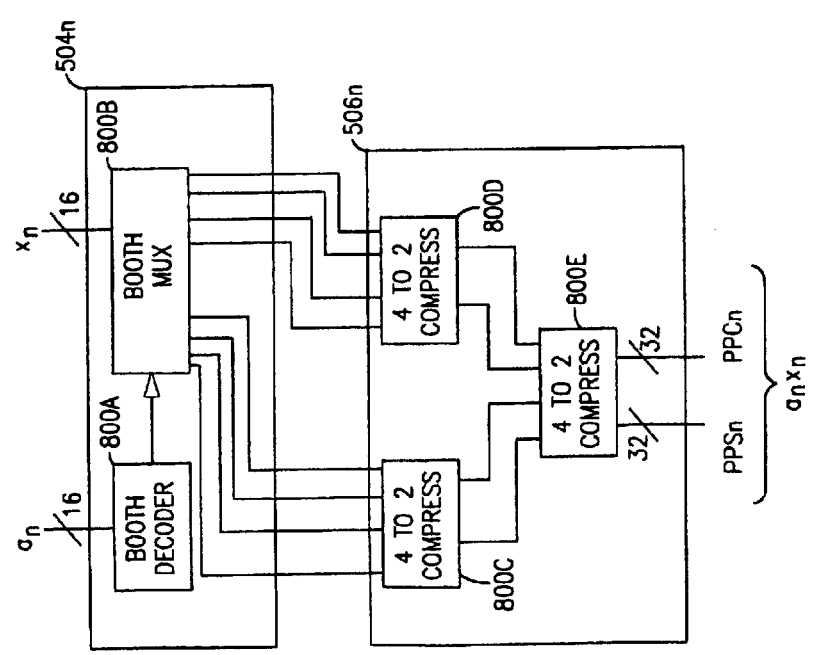

Referring now to FIG. 8, a first configuration of block diagram elements within a core processor 200 for performing the saturated multiplication and accumulation is illustrated. While there are a number of ways to perform multiplication to evaluate terms of $a_nX_n$, the present invention preferably performs it as follows. In FIG. 8, a multiplier 504$n$ and a compressor 506$n$ are configured to evaluate one term of $a_nX_n$ where $a_n$ is multiplied together with $X_n$. Multiplier 504$n$ represents an instance of four multipliers 504 one each from the SPs 300A–300D and compressor 506$n$ represents an instance of four compressors 506 one each from the SPs 300A–300D. The term $a_nX_n$ is preferably performed across the four SPs 300A–300D simultaneously such that four terms of $a_nX_n$ are formed with n in the initial loop varying from 0 through 3. Multiplier 504$n$ is configured to have one of its booth decoders 800A be coupled to the selection input of one of its booth multiplexers 800B. Booth decoder 800A receives as an input the sixteen bit word of $a_n$. Booth multiplexer 800B receives as an input the sixteen bit word of $X_n$. The booth decoder causes the booth multiplexer to generate eight partial product outputs. Of the eight partial product outputs, four are coupled into the 4-to-$_2$ compressor 800C and the other four are coupled into the 4-to-2 compressor 800D of compressor 506$n$. The two outputs from the 4-to-2 compressor 800C and the two outputs from the 4-to-2 compressor 800D are each coupled into the 4-to-2 compressor 800E. The two outputs from the 4-to-2 compressor 800E are the partial products $PPS_n$ and $PPC_n$ of $a_nX_n$. In this manner, SP0 300A performs the multiplication of $a_0X_0$ to form a partial product output $PPS_0$ and $PPC_0$. Signal processing unit 1 SP1 300B performs the multiplication of $a_1$ times $X_1$ to form the partial products $PPS_1$ and $PPC_1$. Signal processing unit 2 SP2 300C performs the multiplication of $a_2$ times $X_2$ to form the partial product output $PPS_2$ and $PPC_2$. The signal processing unit 3 SP3 300D performs the multiplication of $a_3$ times $X_3$ to form the partial product outputs $PPS_3$ and $PPC_3$. Each of the four signal processing units 300A–300D has a multiplier 504 and a compressor 506 configured to compute the $a_nX_n$ term. Each simultaneously performs the multiplication to obtain four $a_nX_n$ terms.

Figure 9:
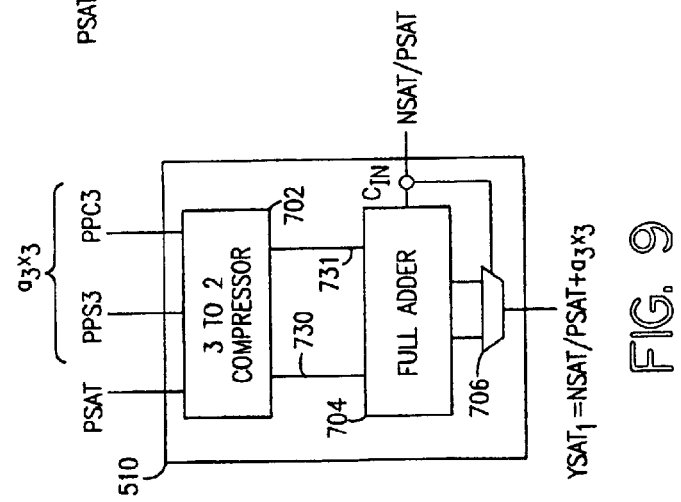

Referring now to FIG. 9, the first of three saturation equations, $YSAT_1$ is determined. $YSAT_1$ is evaluated using one of the adders 510 within one of the signal processing units 300A–300D. In FIG. 9, the equation $YSAT_1$=NSAT/PSAT+$a_3X_3$ is evaluated. The term NSAT/PSAT represents alternative terms and not the mathematical operation of division. Input into adder 510 is PSAT, the partial products $PPS_3$ and $PPC_3$ of $a_2X_3$, and an NSAT/PSAT selection signal. The NSAT/PSAT selection signal selects whether NSAT or PSAT is to be evaluated. The NSAT/PSAT selection signal is input into the adder 510 as the carry-in Cin bit. Full adder 704 receives the NSAT/PSAT selection signal in order to perform the appropriate operation. The three input values of PSAT, $PPS_3$, and $PPC_3$ are input into the 3-to-2 compressor 702, generating the intermediate values 730 and 731, which are then input into the full adder 704 to generate the selected sum output of $YSAT_1$. In the case that NSAT is selected where the NSAT/PSAT selection signal is 1, Cin is 1 and the multiplexer 706 selects the (A+B+1) output from the full adder such that the equation $YSAT_1$=NSAT+$a_3X_3$. In the case that NSAT/PSAT selection signal is zero, Cin is zero and the multiplexer 706 selects the (A+B) output from the full adder 704 as the selected sum output such that the equation $YSAT_1$=PSAT+$a_3X_3$ is evaluated.

Figure 10:
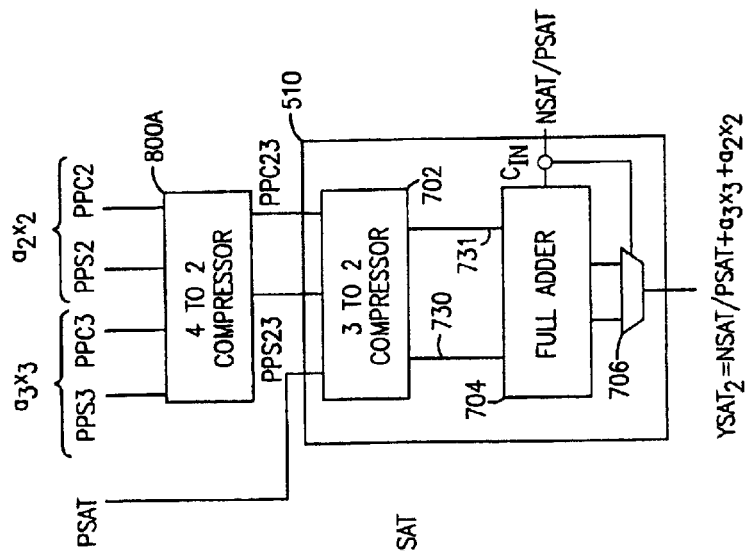

Referring now to FIG. 10, the evaluation of the equation $YSAT_2$ is illustrated. One of the SPs 300A–300D is configured as shown in FIG. 10 to evaluate the equation of $YSAT_2=NSAT/PSAT+a_2X_2+a_3X_3$. A 4-to-2 compressor 800A within compressor 506 is configured to accept the partial products, $PPS_2$ and $PPC_2$ of $a_2X_2$ and $PPS_3$ and $PPC_3$ of $a_3X_3$. The partial product $PPS_{23}$ and $PPC_{23}$ output from the 4-to-2 compressor 800A are input into the 3-to-2 compressor 702 of the adder 510. The third term input into the 3-to-2 compressor 702 is PSAT. The partial product output from the 3-to-2 compressor 702 are added by the full adder 704. The output of from the full adder 704 is selected by multiplexer 706 on its output, selected sum 712. The multiplexer selects the output from the full adder 704 in response to the NSAT/PSAT selection signal. In the case that NSAT/PSAT selection signal is one on the carry-in Cin bit, representing the selection of NSAT equations, then the $YSAT_2$ equation evaluated is $YSAT_2=NSAT+a_3X_3+a_2X_2$. In the case that NSAT/PSAT selection signal is zero on the carry-in Cin bit, representing the selection of the PSAT equation, the multiplexer 706 selects the (A+B) output from the full adder 504 such that the equation $YSAT_2=PSAT+a_3X_3+a_2X_2$ is evaluated.

Figure 11:
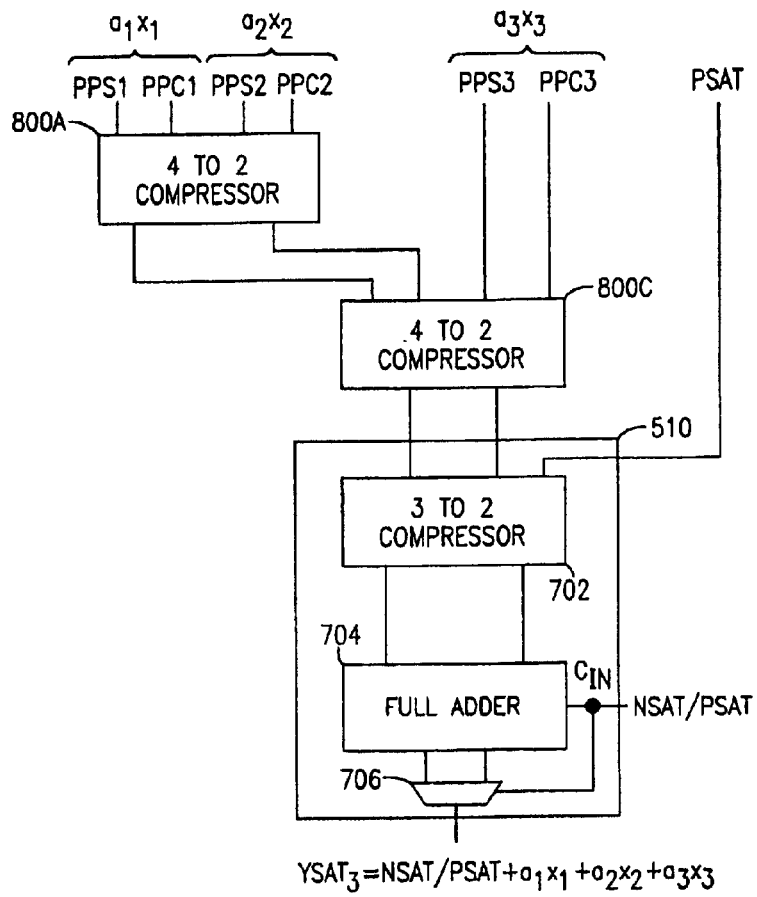

Referring now to FIG. 11, the evaluation of the third saturation equation $YSAT_3$ is illustrated. One of the SPs 300A–300D is configured as illustrated in FIG. 11 to evaluate the equation of $YSAT_3=NSAT/PSAT+a_1X_1+a_2X_2+a_3X_3$. The 4-to-2 compressors 800A and 800C within the compressor 506 and the adder 510 within the same signal processing unit are configured as shown in FIG. 11. Input into the signal processing unit are $a_1X_1$, $a_2X_2$ $a_3X_3$, PSAT and the NSAT/PSAT selection signal. The NSAT/PSAT selection signal is coupled to the carry in Cin of adder 704 and the selection control signal of the two-to-one multiplexer 704. The 4-to-2 compressor 800A evaluates the partial products $PPS_1$ and $PPC_1$ of $a_1X_1$ and the partial products $PPS_2$ and $PPC_2$ of $a_2X_2$. The 4-to-2 compressor 800C evaluates the partial products $PPS_3$ and $PPC_3$ of $a_3X_3$ and the resultant partial product outputs from the evaluation made by the 4-to-2 compressor 800A. The outputs from the 4-to-2 compressor 800C are coupled into the inputs of the 3-to-2 compressor 702 within the adder 510. Outputs from the 3-to-2 compressor 702 are input into the full adder 704 and summed together to generate the (A+B) and the (A+B+1) outputs of the full adder 704. Multiplexer 706 selects between these two outputs in response to the value of the NSAT/PSAT selection signal. In the case that NSAT/PSAT selection signal is one on the carry-in Cin bit, representing the selection of NSAT equations, then the $YSAT_2$ equation evaluated is $YSAT_3=NSAT+a_1X_1+a_2X_2+a_3X_3$. In the case that NSAT/PSAT selection signal is zero on the carry-in Cin bit, representing the selection of the PSAT equation, the multiplexer 706 selects the (A+B) output from the full adder 504 such that the equation $YSAT_3=PSAT+a_1X_1+a_2X_2+a_3X_3$ is evaluated.

Figure 12:
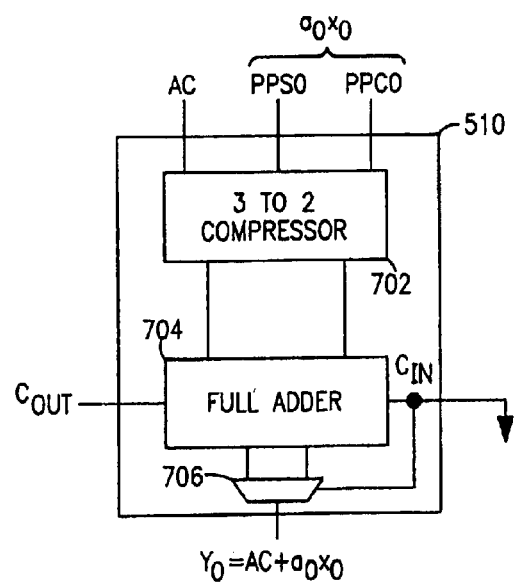

Referring now to FIG. 12, the first of four accumulation equations $Y_0$–$Y_3$ is illustrated as being evaluated. One of the signal processing units 300A–300D has one of its adders 510 configured as illustrated in FIG. 12 to evaluate the equation $Y_0=AC+a_0X_0$. As illustrated in FIG. 12, the 3-to-2 compressor 702 of the adder 510 receives as inputs the term AC and the partial products $PPS_0$ and $PPC_0$ of $a_0X_0$. The partial product outputs from the 3-to-2 compressor are fed into the A and B inputs of the full adder 704. Carry-in Cin to the full adder 704 is set to zero. The (A+B) output 710 from the full adder 704 is selected by the multiplexer 706 through its control signal being set to zero in order to generate equation $Y_0$ on the selected sum output 712 of adder 510.

Referring now to FIG. 13, a second accumulation equation Y1 is illustrated as being evaluated. One of the signal processing units 300A–300D has its component blocks configured as illustrated in FIG. 13 to evaluate equation $Y_1=AC+a_0X_0+a_1X_1$. As illustrated in FIG. 13, the 4-to-2 compressor 800A of the compressor block 506 receives as input the partial products $PPS_0$ and $PPC_0$ of $a_0X_0$ and the partial products $PPS_1$ and $PPC_1$ of $a_1X_1$. The two resultant partial product outputs from the compressor 800A are input into two inputs of the 3-to-2 compressor 702 of adder 510. The third input term input into the 3-to-2 compressor 702 is AC. The partial products output from the 3-to-2 compressor 702 are fed into the A and B inputs of the full adder 704. Carry-in Cin to the full adder 704 and control input into the multiplexer 704 are both set to zero. The (A+B) output 710 from the full adder 704 is selected by the multiplexer 706 through its control signal being set to zero in order to generate equation $Y_1$ equals $AC+a_0X_0+a_1X_1$ on the selected sum output 712 of adder 510.

Referring now to FIG. 14, a third accumulation equation $Y_2$ is illustrated as being evaluated. One of the signal processing units 300A–300D has its component blocks configured as illustrated in FIG. 14 to evaluate the equation $Y_2=AC+a_0X_0+a_1X_1+a_2X_2$. The signal processor 300 accepts as input partial products of $a_0X_0$, $a_1X_1$, $a_2X_2$ and $a_3X_3$, and the accumulation value of AC. The 4-to-2 compressor 800A receives as inputs the partial products $PPS_0$ and $PPC_0$ of $a_0X_0$, the partial products $PPS_1$ and $PPC_1$ of $a_1X_1$. The 4-to-2 compressor 800C receives as inputs the partial products $PPS_2$ and $PPC_2$ of $a_2X_2$. The two additional inputs into the 4-to-2 compressor 800C are the resultant partial product outputs from the 4-to-2 compressor 800A. The partial product outputs from the 4-to-2 compressor 800C are coupled into two inputs of the 3-to-2 compressor 702 of the adder 510. The third input into the 3-to-2 compressor 702 is the term AC. The partial products output from the 3-to-2 compressor 702 are fed into the A and B inputs of the full adder 704. Carry-in Cin to the full adder 704 and control input into the multiplexer 704 are both set to zero. The (A+B) output 710 from the full adder 704 is selected by the multiplexer 706 through its control signal being set to zero in order to generate the equation $Y_2=AC+a_0X_0+a_1X_1+a_2X_2$ on the selected sum output 712 of adder 510.

Figure 15:
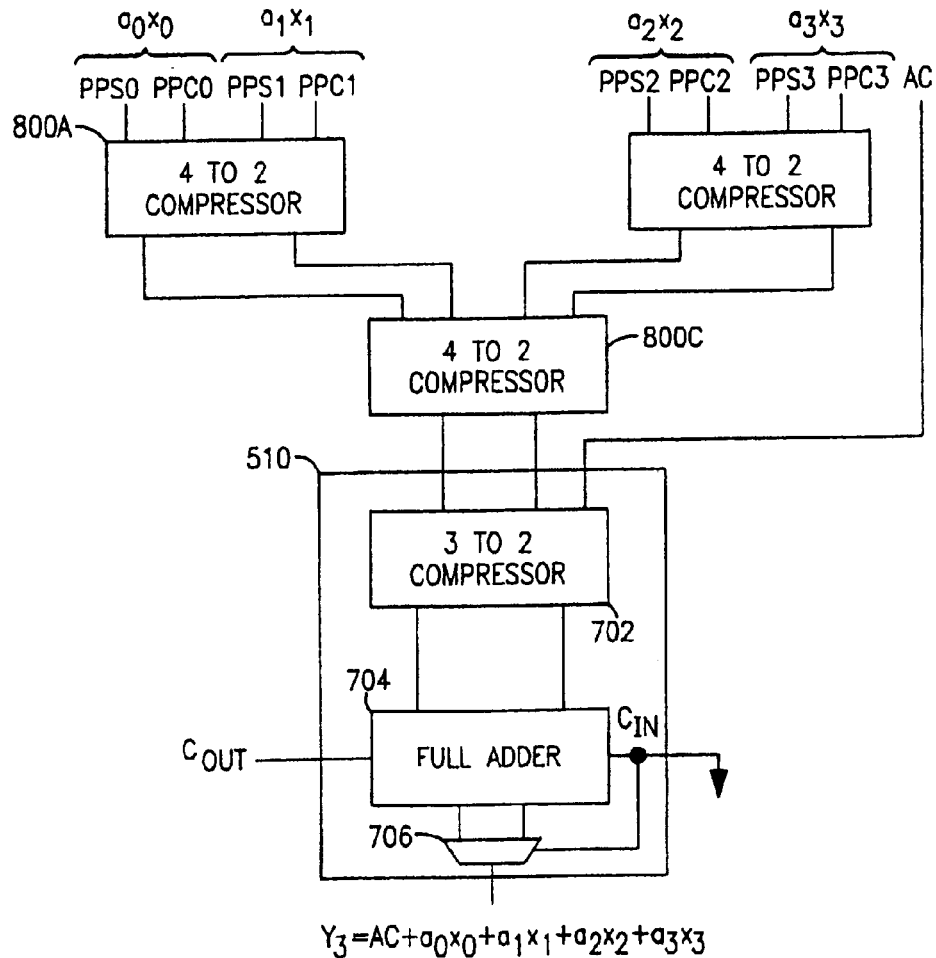

Referring now to FIG. 15, a fourth accumulation equation $Y_3$ is illustrated as being evaluated. One of the signal processing units 300A–300D has its component blocks configured as illustrated in FIG. 15 to evaluate the equation $Y_3=AC+a_0X_0+a_1X_1+a_2X_2+a_3X_3$. The 4-to-2 compressors 800A, 800B and 800C of the compressor 506 are configured as shown in FIG. 15. The 4-to-2 compressor 800A receives as inputs the partial products $PPS_0$ and $PPC_0$ of $a_0X_0$ and the partial products $PPS_1$ and $PPC_1$ of $a_1X_1$. The 4-to-2 compressor 800B receives as inputs the partial products $PPS_2$ and $PPC_2$ of $a_2X_2$ and the partial products $PPS_3$ and $PPC_3$ of $a_3X_3$. The outputs from the 4-to-2 compressor 800A and the 4-to-2 compressor 800B are coupled into the inputs of the 4-to-2 compressor 800C. The resultant partial product outputs from the 4-to-2 compressor 800C are coupled into two of the inputs of the 3-to-2 compressor 702 of the adder 510. The third input into the 3-to-2 compressor 702 is the accumulation value AC. The partial products output from the 3-to-2 compressor 702 are fed into the A and B inputs of the full adder 704. Carry-in Cin to the full adder 704 and control input into the multiplexer 704 are both set to zero. The (A+B) output 710 from the full adder 704 is selected by the multiplexer 706 through its control signal being set to zero in order to generate equation $Y_3=AC+a_0X_0+a_1X_1+a_2X_2+a_3X_3$ on the selected sum output 712 of adder 510. Note that the formation of these possible resultant outputs for YOUTn requires at least seven full adders. The four signal processing units 300A–300D have a total of twelve full adders such that performing these additions to obtain the possible resultants increases the efficiency of the available components.

Figure 16:
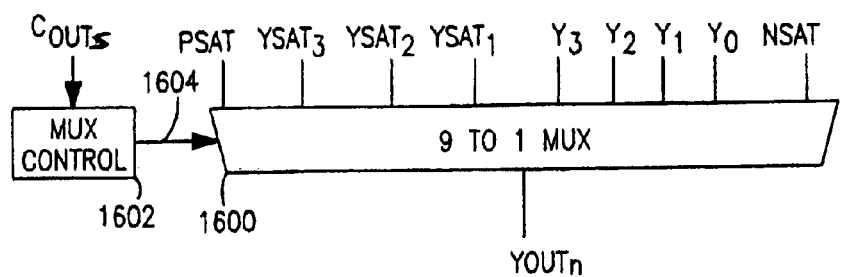

Referring now to FIG. 16, the multiplexer blocks 508 of the four signal processing units SPs 300–300D are configured and controlled as illustrated and shown in FIG. 16. Multiplexer blocks 508 within each of the SPs 300A–300D are used to form the 9-to-1 multiplexer 1600 and to perform the nine to one multiplexing function to generate YOUTn. The 9-to-1 multiplexer 1600 receives at its nine inputs PSAT, $YSAT_3$, $YSAT_2$, $YSAT_1$, $Y_3$, $Y_2$, $Y_1$, $Y_0$ and NSAT. Multiplexer control logic 1602 within the core processor 200 generates the multiplexer control signals 1604 to control the selection of the output of the 9-to-1 multiplexer 1600. The multiplexer control logic 1602 receives the sign bits from equations illustrated in FIG. 6 and other control signals in order to properly select one of the nine terms input into the 9-to-1 multiplexer 1600 as the multiplexer output. Some of the equations in FIG. 6 that do not need to be completely evaluated because they are not input into the 9-to-1 multiplexer 1600. Only the sign bit of the result, typically the MSB of the result, needs to be determined in these cases. In which case, simple combinatorial logic only need be used to determine the sign of the result. For example, in multiplying two terms together, only the sign bits of the terms need be evaluated to determine the sign of the result. If both terms are negative or both positive, the result is positive. If only one of the terms is negative, then the result is a negative number. Similar logic is used in evaluating the addition of terms and knowing the saturation values of PSAT and NSAT and what values can be added or subtracted therefrom to change the sign bit. In these cases it is easy to predict underflow or overflow of the result. The manner in which four terms of the saturated multiplication and accumulation equation $YOUTn=((((AC+_L a_0 X_0)+_L a_1 X_1)+_L a_2 X_2)+_L a_3 X_3)$ are evaluated has been described. If additional terms are to be evaluated, YOUTn is saved as the new accumulation value AC and input with the evaluation of the next four terms on the next clock cycle. This can continue on indefinitely but is typically limited to a number of terms in order to receive a desired accuracy.

As those of ordinary skill will recognize, the present invention has many advantages. One advantage of the present invention is that for nonvectorized processing, multiple samples are simultaneously computed thereby reducing the delay. Another advantage of the present invention is that the number of full additions is minimized in the saturated multiplication and accumulation such that the present invention is more efficient and uses fewer adders to perform the addition. Another advantage of the present invention is that it reduces the number of cycles to process the saturated multiplication and accumulation such that the channel handling capability increases to aggregate more communication channels to one device.

The preferred embodiments of the present invention are thus described. While the present invention has been described in particular embodiments, it may be implemented in hardware, software, firmware or a combination thereof and utilized in systems, subsystems, components or subcomponents thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A signal processor comprising:
   at least one core processor to process data samples of a digital input signal using a digital signal processing algorithm, the at least one core processor including,
   a plurality of signal processing units to execute the digital signal processing algorithm and to process in parallel the data samples of the digital input signal, the plurality of signal processing units to generate a digital output signal in response to the data samples of the digital input signal and the digital signal processing algorithm, and
   a reduced instruction set computer (RISC) processor to control the plurality of signal processing units in processing the data samples of the digital input signal, wherein,
   the plurality of signal processing units comprises four signal processing units and the digital signal processing algorithm is a non-vectorized equation in the form of $YOUTn=((((AC+_L a_0 X_0)+_L a_1 X_1)+_L a_2 X_2)+_L a_3 X_3)$ where "$+_L$" refers to a limiting of the addition to a range of values between a positive saturation value and a negative saturation value of a saturated multiplication and accumulation technique and AC is an accumulated value of a prior processing cycle.

2. A signal processor comprising:
   at least one core processor to process data samples of a digital input signal using a digital signal process algorithm, the at least core processor including,
   a plurality of signal processing units to execute the digital signal processing algorithm and to process in parallel the data samples of the digital input signal, the plurality of signal processing units to generate a digital output signal in response to the data samples of the digital input signal and the digital signal processing algorithm, and
   a reduced instruction set computer (RISC) processor to control the plurality of signal processing units in processing the data samples of the digital input signal, wherein, each of the plurality of signal processing units includes
   at least three adders to add terms together,
   a compressor to compress more than two terms into a pair of terms,
   an accumulation register to save a prior state for the next addition cycle, and
   at least two multipliers to multiply terms together.

3. The signal processor of claim 2, wherein, the RISC processor to control the plurality of signal processing units includes
   an adder,
   a memory address generator,
   a multiplier, and
   a barrel shifter.

4. The signal processor of claim 3, wherein the at least one core processor further includes,
   a data memory coupled to the RISC processor and the plurality of signal processing units, and
   a program memory coupled to the RISC processor and the plurality of signal processing units.

5. A method of performing saturated multiplication and accumulation, the method comprising:

multiplying a plurality of digital samples with a plurality of coefficients to generate a plurality of terms;

adding a first term of the plurality of terms to an accumulated value and if needed, limiting the result to a positive saturation value or a negative saturation value as a first add output or, if not needed, selecting the result as the first add output;

adding a second term of the plurality of terms to the first add output and if needed, limiting the result to the positive saturation value or the negative saturation value as a second add output or, if not needed, selecting a second plurality of added results as the second add output;

adding a third term of the plurality of terms to the second add output and if needed, limiting the result to the positive saturation value or the negative saturation value as a third add output or, it not needed, selecting a third plurality of added results as the third add output;

adding a fourth term of the plurality of terms to the third add output and if needed, limiting the result to the positive saturation value or the negative saturation value as a fourth add output or, if not needed, selecting a fourth plurality of added results as the fourth add output;

selecting either the negative saturation value, the positive saturation value, or one of the fourth plurality of added results of the fourth add output as a result of a non-vectorized equation; and providing a signal processor, the signal processor including at least one core processor having
a plurality of signal processing units to process the terms and to perform the addition of terms in parallel using saturated multiplication and accumulation, and
a reduced instruction set computer (RISC) processor to control the plurality of signal processing units.

6. The method of claim 5, wherein the non-vectorized equation is $YOUTn=((((AC+_L a_0 X_0)+_L a_1 X_1)+_L a_2 X_2)+_L a_3 X_3)$ where "$+_L$" refers to a limiting of the addition to a range of values between the positive saturation value and the negative saturation value and AC is the accumulated value for a prior processing cycle;

the multiplying of the plurality of digital samples with the plurality of coefficients generates the terms $a_0 X_0$, $a_1 X_1$, $a_2 X_2$ and $a_3 X_3$;

the adding of the first term to the accumulated value performs $(AC+_L a_0 X_0)$ as the first add output;

the adding of the second term to the first add output performs $(AC+_L a_0 X_0)+_L a_1 X_1$) as the second add output;

the adding of the third term to the second add output performs $((((AC+_L a_0 X_0)+_L a_1 X_1)+_L a_2 X_2)$ as the third add output; and the adding of the fourth term to the third add output performs $((((AC+_L a_0 X_0)+_L a_1 X_1)+_L a_2 X_2)+_L a_3 X_3)$ as the fourth add output for selection.

7. The method of claim 6, wherein, the signal processor performs multiplication of the plurality of digital samples with the plurality of coefficients to generate the plurality of terms;

performs addition of terms in order to determine the fourth add output;

multiplexes a selected one of the fourth add output as the result of the non-vectorized equation, and wherein the multiplication, the addition of terms, and the multiplexing are performed by the signal processor at the same time to obtain the result in one step.

8. A signal processor comprising:

means to multiply a plurality of digital samples with a plurality of coefficients to generate a plurality of terms;

means to add a first term of the plurality of terms to an accumulated value and limit it to a first sum or a positive saturation value or a negative saturation value as a first add output;

means to add a second term of the plurality of terms to the first add output and limit it to a second sum or the positive saturation value or the negative saturation value as a second add output;

means to add a third term of the plurality of terms to the second add output and limit it to a third sum or the positive saturation value or the negative saturation value as a third add output;

means to add a fourth term of the plurality of terms to the third add output as a fourth add output; and means to select either the negative saturation value, the positive saturation value, or a fourth sum of the fourth add output as a result.

9. The signal processor of claim 8, wherein, the limiting to the sum, the positive or the negative saturation value is indicated by a carry signal in the means to add.

10. The signal processor of claim 8, wherein, the selecting of the result is indicated by carry signals in each means to add.

11. A method of saturated multiplication and accumulation comprising:

multiplying a plurality of digital samples with a plurality of coefficients to generate a plurality of terms;

adding a first term of the plurality of terms to an accumulated value and limiting it to a first sum or a positive saturation value or a negative saturation value as a first add output;

adding a second term of the plurality of terms to the first add output and limiting it to a second sum or the positive saturation value or the negative saturation value as a second add output;

adding a third term of the plurality of terms to the second add output and limiting it to a third sum or the positive saturation value or the negative saturation value as a third add output;

adding a fourth term of the plurality of terms to the third add output as a fourth add output;

selecting either the negative saturation value, the positive saturation value, or a fourth sum of the fourth add output as a result; and providing a signal processor, the signal processor including at least one core processor having
a plurality of signal processing units to process the terms and to perform the addition of terms in parallel using saturated multiplication and accumulation, and
a reduced instruction set computer (RISC) processor to control the plurality of signal processing units.

12. The method of claim 11, wherein, the limiting to the sum, the positive or the negative saturation value is indicated by a carry.

13. The method of claim 11, wherein, the selecting of the result is indicated by carries of the addings.

* * * * *

UNITED STATES PATENT AND TRADEMARK OFFICE
CERTIFICATE OF CORRECTION

PATENT NO. : 6,842,845 B2
DATED : January 11, 2005
INVENTOR(S) : Ganapathy et al.

It is certified that error appears in the above-identified patent and that said Letters Patent is hereby corrected as shown below:

Column 14,
Line 36, after "least", insert -- one --.

Signed and Sealed this

Thirty-first Day of May, 2005

JON W. DUDAS
*Director of the United States Patent and Trademark Office*